(12) United States Patent
Chen et al.

(10) Patent No.: US 11,953,079 B2
(45) Date of Patent: Apr. 9, 2024

(54) KNOB-DRIVEN ADJUSTING MECHANISM

(71) Applicant: SHIN FANG PLASTIC INDUSTRIAL CO., LTD., Taichung (TW)

(72) Inventors: Yuan-Ming Chen, Taichung (TW); Tuan-Yu Chen, Taichung (TW); Yen-Yu Chen, Taichung (TW)

( * ) Notice: Subject to any disclaimer, the term of this patent is extended or adjusted under 35 U.S.C. 154(b) by 101 days.

(21) Appl. No.: 17/851,320

(22) Filed: Jun. 28, 2022

(65) Prior Publication Data
US 2023/0417306 A1 Dec. 28, 2023

(51) Int. Cl.
*F16H 19/04* (2006.01)

(52) U.S. Cl.
CPC ................... *F16H 19/04* (2013.01)

(58) Field of Classification Search
CPC ....................................................... F16H 19/04
See application file for complete search history.

(56) References Cited

U.S. PATENT DOCUMENTS

| | | | | |
|---|---|---|---|---|
| 5,357,654 A * | 10/1994 | Hsing-Chi | ........... | A63B 33/002 2/418 |
| 5,950,245 A * | 9/1999 | Binduga | ................ | A42B 3/145 24/68 B |
| 7,000,262 B2 * | 2/2006 | Bielefeld | ............... | A42B 3/145 2/418 |
| 7,707,695 B2 * | 5/2010 | Dubois | ................... | A42B 3/145 2/418 |
| 8,032,993 B2 * | 10/2011 | Musal | ..................... | A42B 3/145 2/418 |
| 8,056,150 B2 * | 11/2011 | Stokes | ................... | A42B 3/145 2/418 |
| 8,424,168 B2 * | 4/2013 | Soderberg | ............ | A43B 3/0042 2/418 |
| 9,161,588 B2 * | 10/2015 | Chen | ...................... | A42B 3/324 |
| 9,357,811 B2 * | 6/2016 | Chiang | .................. | A42B 3/14 |
| 10,561,208 B2 * | 2/2020 | Cui | ....................... | A44C 5/2071 |
| 2002/0178548 A1 * | 12/2002 | Freed | ..................... | A43C 11/08 24/19 |
| 2013/0014359 A1 * | 1/2013 | Chen | ...................... | A42B 3/145 24/68 SK |

* cited by examiner

*Primary Examiner* — David M Upchurch
(74) *Attorney, Agent, or Firm* — Egbert, McDaniel & Swartz, PLLC

(57) ABSTRACT

A knob-driven adjusting mechanism has two fastening belts, one adjusting device, two base seats and two shafts. The fastening belt goes through a long groove. The fastening belt is formed with a tooth row on the side of the long groove. The adjusting device has a shell seat and a knob, and each fastening belt respectively goes through the shell seat. The knob is configured on the shell seat in a rotary form to drive the fastening belts. Each base seat is respectively used for the two side parts configured on an object. The base seat has two protruding support parts. Each shaft is respectively configured on each base seat. The two ends of the shaft respectively goes into each support part in the axial direction. Each shaft is respectively connected to each fastening belt, so that each fastening belt can respectively rotate in relation to the base seat.

4 Claims, 6 Drawing Sheets

KNOB-DRIVEN ADJUSTING MECHANISM

CROSS-REFERENCE TO RELATED U.S. APPLICATIONS

Not applicable.

BACKGROUND OF THE INVENTION

1. Field of the Invention

The present invention relates generally to an adjusting mechanism to adjust an object by pulling, and more particularly to a knob-driven adjusting mechanism.

2. Description of Related Art Including Information Disclosed Under 37 CFR 1.97 and 37 CFR 1.98

A knob-driven adjusting mechanism can be used to adjust an object by pulling. Said object has two opposite side parts. Said knob-driven adjusting mechanism is connected to each of the side parts, pulling each of the side part to move close to or apart from each other. Examples of such object include but are not limited to: shoes and boots, pedals of a bike, water bottle frames, and head straps. The prior-art knob-driven adjusting mechanism comprises two fastening belts and one adjusting device, wherein the fastening belt is a long curved strap. The fastening belt is made of a material that can be slightly curved and deformed under an external force. One end of the fastening belt is formed with two bar-shaped connecting parts. The connecting part is connected to a base part. The base part is used to abut the side parts of the object. A bolt locks the base part with the side part. The fastening belt goes through a long groove. The two ends of the long groove are respectively directed to the two ends of the fastening belt. The fastening belt is configured with a tooth row formed by a plurality of convex teeth arranged at intervals on the side of the long groove.

The adjusting device comprises a shell seat and a knob, wherein each fastening belt respectively goes through the shell seat. The knob is configured on the shell seat in a rotary form. When the user operates the knob to rotate, each fastening belt will be driven to pull each of the side parts to move close to or away from each other.

Based on the usage requirement of the object, when the fastening belt falls apart from the shell seat and rotates in relation to the side part, the bolt will limit the base part to abut the side part, the reciprocating rotation of the fastening belt will have repeated deformation of the connecting part in different directions, resulting in breakage of the bar-shaped connecting part. After breakage of the connecting part, because it is difficult to remove the bolt and to remove the base part from the object to configure another fastening belt, the prior-art knob-driven adjusting mechanism can no longer be used. This results in inefficient use of the object.

Based on years of experience in the design and development of relevant products, the inventor made in-depth analysis and assessment of the problems existing in the prior-art knob-driven adjusting mechanism, and developed the present invention with improved and more practical design.

BRIEF SUMMARY OF THE INVENTION

The main object of the present invention is to make a breakthrough and solve the technical problem existing in the prior art by developing a new knob-driven adjusting mechanism that is ideal and practical.

Based on the above object, the present invention provides a knob-driven adjusting mechanism that comprises two fastening belts, respectively in the form of a long curved strap. The fastening belt goes through a long groove. The two ends of the long groove are respectively directed to the two ends of the fastening belt. The fastening belt is formed with a plurality of convex teeth, and the convex teeth are sequentially configured at intervals on one side of the long groove to form a tooth row.

One adjusting device has a shell seat and a knob, wherein, each fastening belt respectively goes through the shell seat, and the fastening belts are opposite each other in the direction of the thickness. The knob is configured on the shell seat in a rotary form, so that it can be rotated to drive each fastening belt.

Two base seats are respectively used for the two side parts configured on an object. Each base seat has two protruding support parts which are opposite each other along the direction of the width of the fastening belt. Each support part respectively goes through a shaft hole.

Two shafts are respectively configured on each base seat. The two ends of the shaft respectively goes into each shaft hole in the axial direction. Each shaft is respectively connected to each fastening belt, so that each fastening belt can respectively rotate in relation to the base seat.

Based on such an innovative structural design and such technical features, the present invention made in inventive step over the prior art. It can effectively avoid repeated curving and deformation of a specific part of the fastening belt in different directions, and can extend the service life of the fastening belt. This is truly a practical improvement.

DETAILED DESCRIPTION OF THE INVENTION

Figure 1:
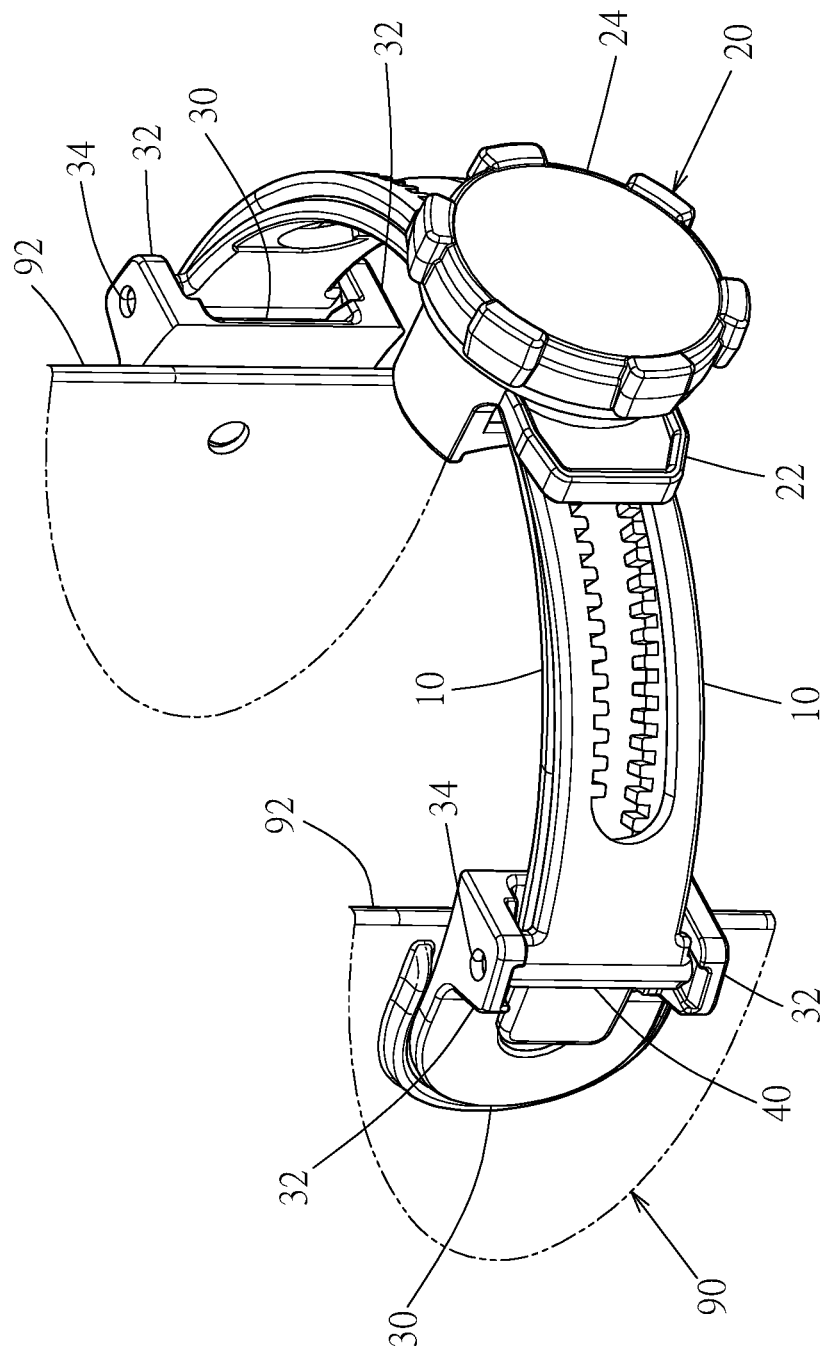
FIG. 1 is a perspective view of Embodiment 1 of the invention.
Figure 2:
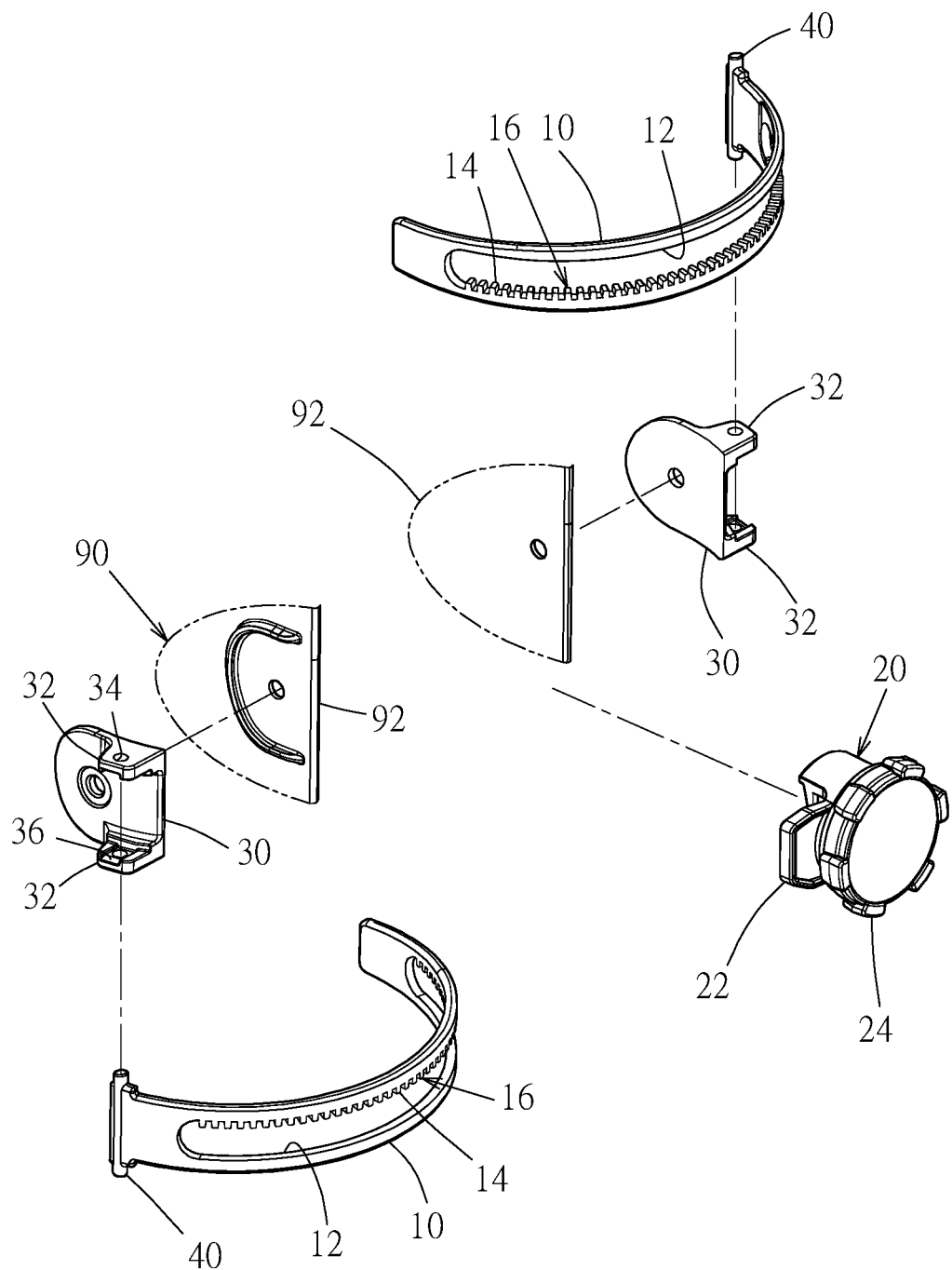
FIG. 2 is a partial exploded perspective view of Embodiment 1 of the invention.
Figure 3:
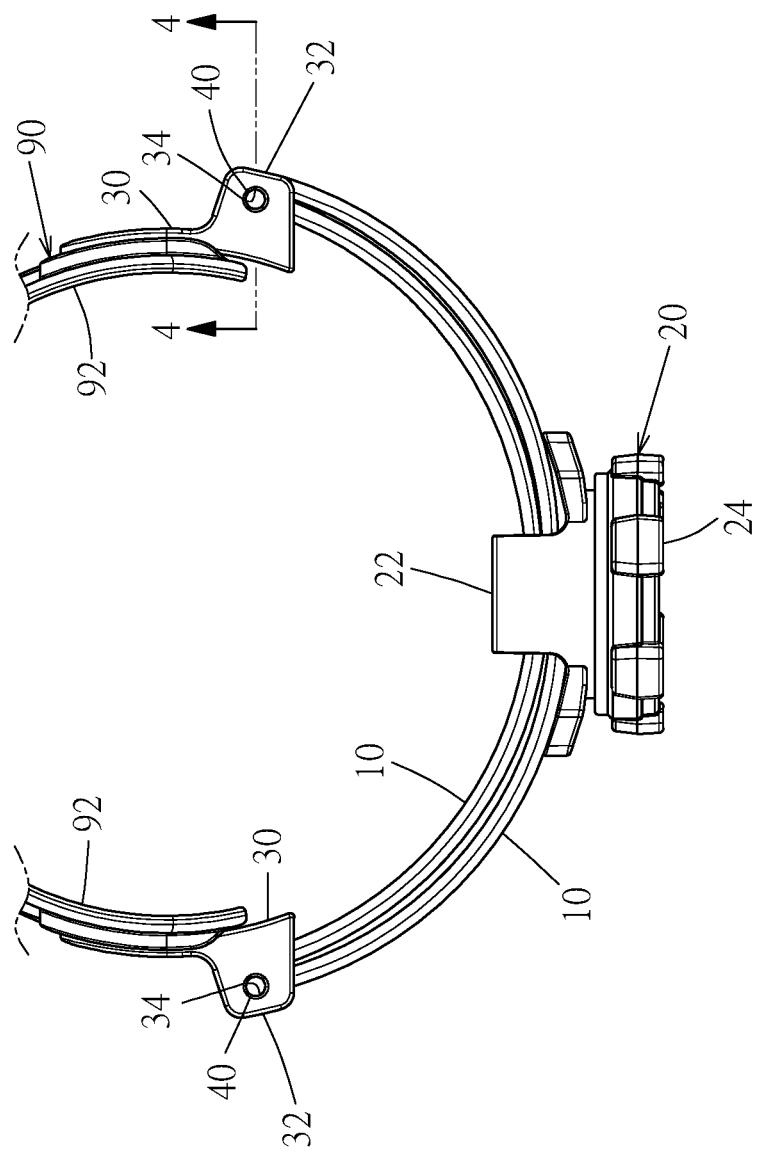
FIG. 3 is a top view of Embodiment 1 of the invention.
Figure 4:
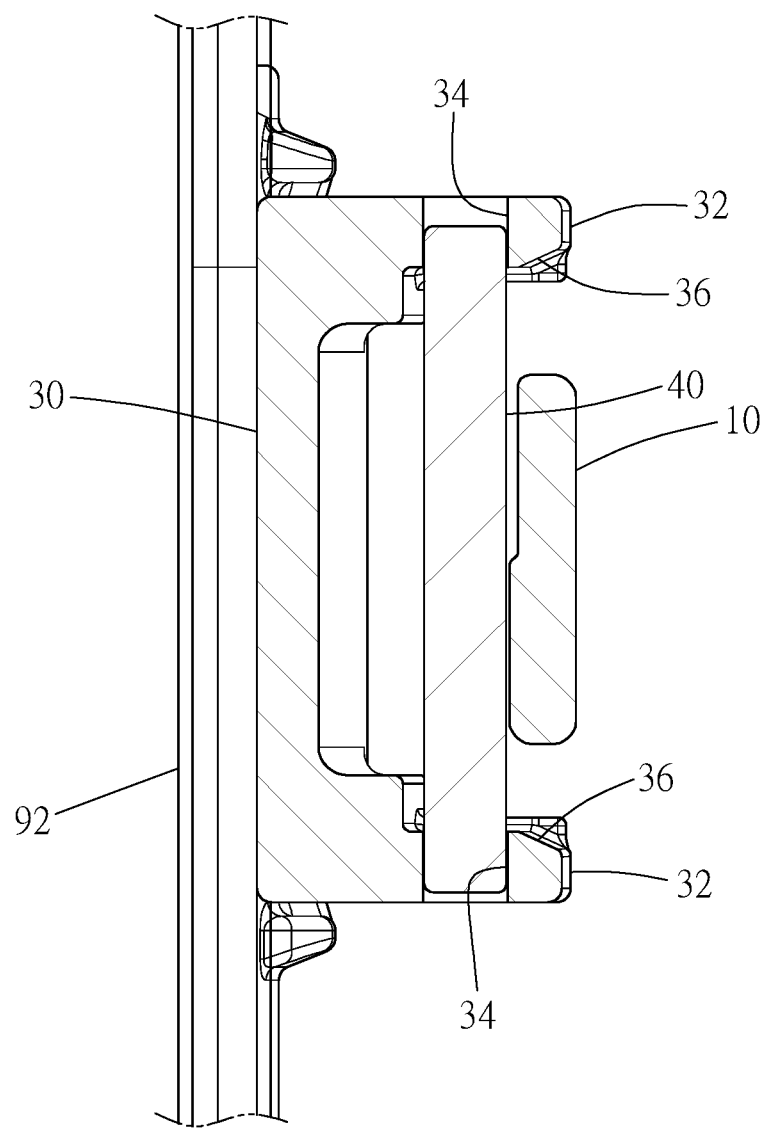
FIG. 4 is 4-4 sectional view of FIG. 3.

The figures are provided for the purpose of illustrating the embodiments of the knob-driven adjusting mechanism disclosed in the invention. However, such embodiments are for descriptive purposes only and are not intending to limit the scope of the invention.

As depicted in FIG. 1 to FIG. 4, Embodiment 1 of the knob-driven adjusting mechanism comprises two fastening belts 10, one adjusting device 20, two base seats 30 and two shafts 40. Each fastening belt 10 is respectively in the form of a long curved strap. The fastening belt 10 is made of a material that can slightly curve and deform under an external force. The fastening belt 10 goes through a long groove 12. The two ends of the long groove 12 are respectively directed to the two ends of the fastening belt 10. The fastening belt 10 is formed with a plurality of convex teeth 14. The convex teeth 14 are sequentially configured at intervals on one side of the long groove 12 to form a tooth row 16.

The adjusting device 20 comprises a shell seat 22 and a knob 24, wherein each fastening belt 10 respectively goes through the shell seat 22, and the fastening belts 10 are opposite each other in the direction of thickness. The knob 24 is configured on the shell seat in a rotary form 22. The knob 24 goes into the shell seat 22, so that it can be rotated to drive each fastening belt 10. The adjusting device 20 and the technical means based on which the adjusting device 20 drives the fastening belt is prior art commonly known by those skilled in the art, and therefore the details of the adjusting device 20 are not provided herein.

The base seats 30 are respectively used for configuration on the two side parts 92 of an object 90. The base seat 30 has two protruding support parts 32. The support parts 32 are opposite each other along the direction of the width of the fastening belt 10. Each support part 32 respectively goes through a shaft hole 34.

Each shaft 40 is respectively configured on each base seat 30. The two ends of the shaft 40 respectively go into each shaft hole 34 in the axial direction. Each shaft 40 is respectively connected to each fastening belt 10, so that each fastening belt 10 can respectively rotate in relation to each base seat 30.

When the user rotates the knob 24 to drive each fastening belt 10 to move reversely, each fastening belt 10 pulls each of the side parts 92 to move close to or apart from each other. Based on usage requirement of the object 90, when the fastening belt 10 falls apart from the shell seat 22 and rotates in relation to the side part 92, the relative structures of the fastening belt 10, the shaft 40 and the base seat 30 will not cause repeated curving and deformation of a specific part of the fastening belt 10 in different directions, thus avoiding breakage of the fastening belt 10, and extending the service life of the fastening belt 10.

Each shaft 40 is respectively and integrally connected to each fastening belt 10. Specifically, the two ends of the shaft 40 are protruded out of the two sides of the fastening belt 10 in the direction of width. When the shaft 40 is fitted on the base seat 30, the shaft 40 relatively presses each support part 32 from the side of the base seat 30. Based on the material elasticity of the fastening belt 10, the base seat 30, and the shaft 40, the fastening belt 10 can go into each of the support parts 32, and the shaft 40 can extend into each shaft hole 34.

The two ends of the shaft 40 are protruded out of the fastening belt 10, and each of the support parts 32 is respectively further formed with a tilted guiding surface 36. Thus, when the shaft 40 is fitted on the base seat 30, each of the guiding surfaces 36 will guide the two ends of the shaft 40 to go respectively into each of the shaft holes 34. This will reduce the difficulty of operation to configure the shaft 40 on the base seat 30.

Figure 5:
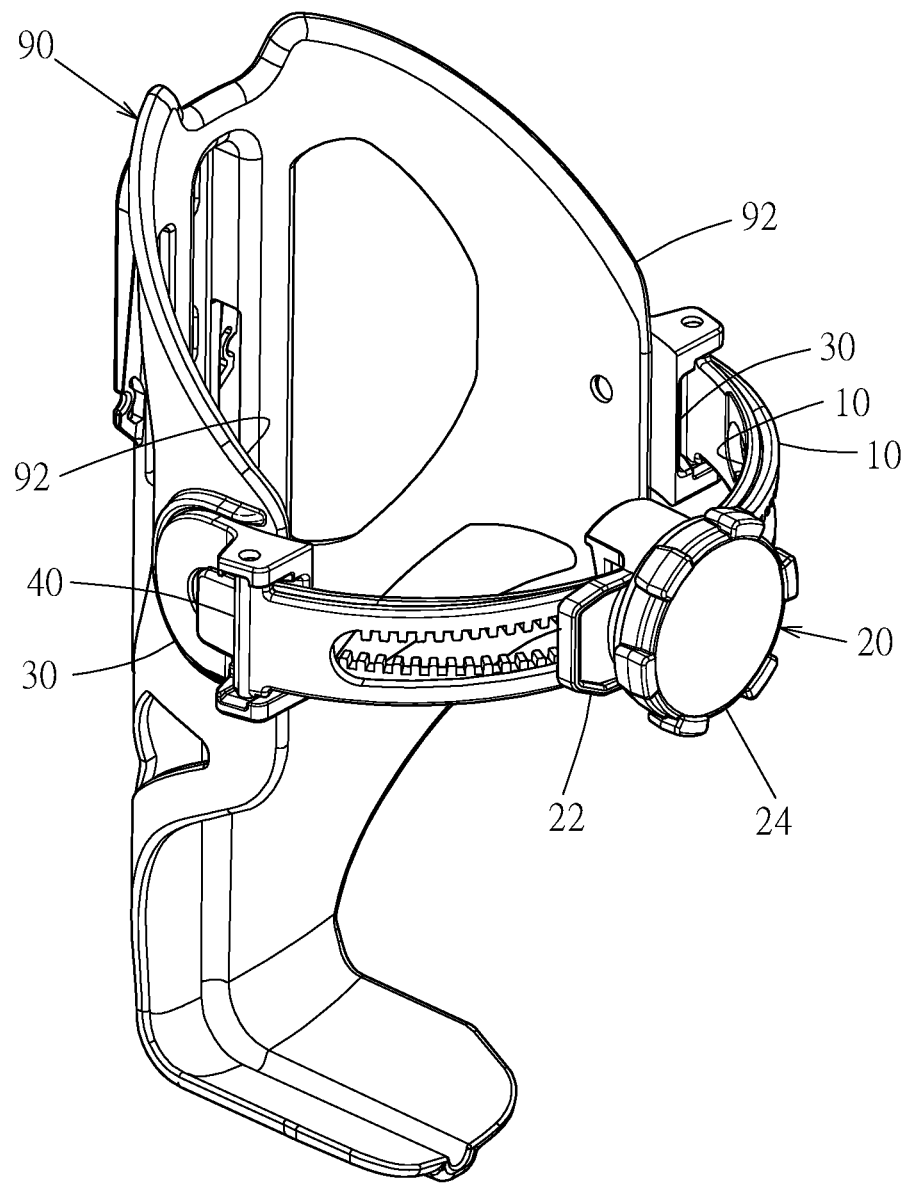
FIG. 5 is a perspective view of a water bottle frame configured with Embodiment 1 of the invention.

FIG. 5 shows an example of the object 90, which is a water bottle frame fitted on a bike. FIG. 5 is just an application example of Embodiment 1. Actual examples of the object 90 can include but not limited to: shoes and boots, pedals of a bike, water bottle frames, and head straps. FIG. 5 cannot be construed to limit the application of the present invention.

Figure 6:
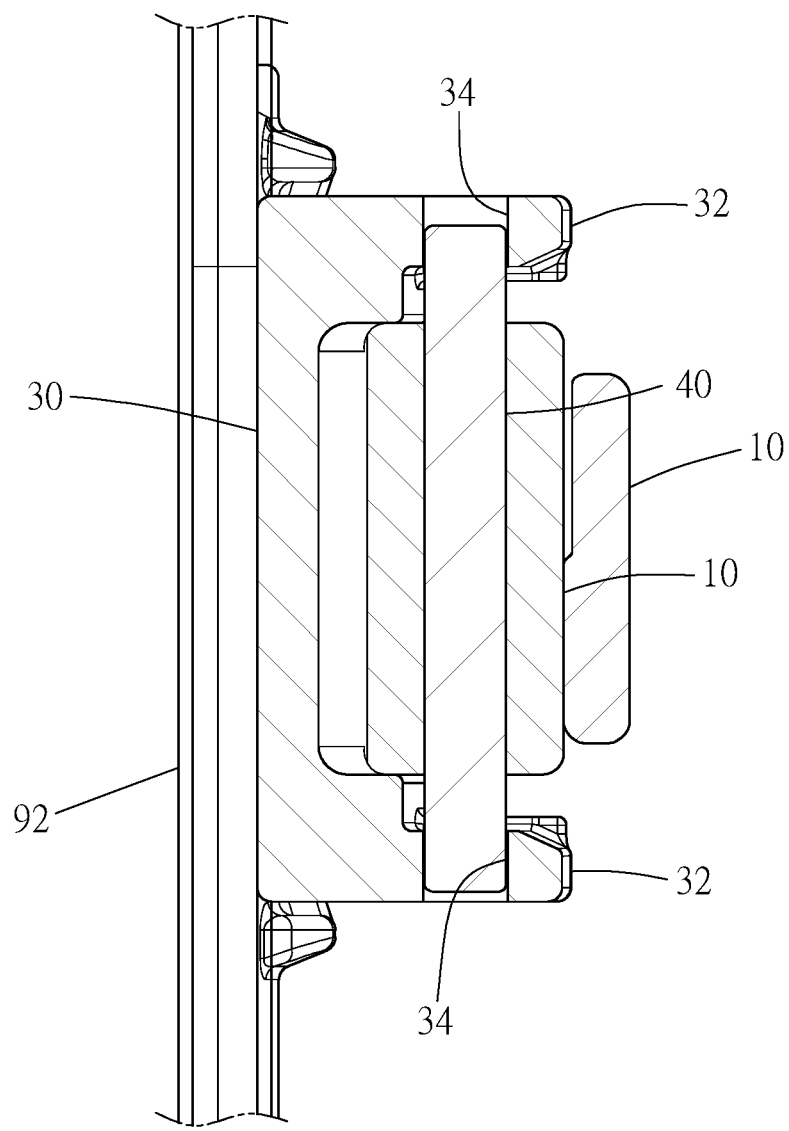
FIG. 6 is a sectional view of the shaft part of Embodiment 2.

Referring to FIG. 6, Embodiment 2 differs from Embodiment 1 mainly in that, the fastening belt 10 and the shaft 40 are not connected integrally, one end of the fastening belt 10 goes between each of the support parts 32, each shaft 40 respectively goes through each fastening belt 10. Based on this, the assembly of the fastening belt 10, the base seat 30, and the shaft 40 is more convenient in Embodiment 2 than in Embodiment 1.

We claim:

1. A knob-driven mechanism comprising:
   a pair of fastening belts each having a shape of an elongated curved strap, each of said pair of fastening belts extending through an elongated groove such that opposite ends of the elongated groove face opposite ends of the fastening belt, each of the said pair of fastening belts having a plurality of convex teeth, the plurality of convex teeth being sequentially configured in spaced relation on one side of the elongated groove so as to form a tooth row;
   an adjusting device having a shell seat and a knob, each of said pair of fastening belts extend through the shell seat, the knob being in rotary relation on the shell set, the knob being rotatable so as to drive each of said pair of fastening belts;
   a pair of base seats each having a pair of protruding support parts, the pair of protruding support parts being opposite to each other relative to a width of the fastening belt, each of the pair of protruding support parts respectively extending through a shaft hole; and
   a pair of shafts respectively configured on said pair of base seats, each of said pair of shafts having opposite ends respectively extending axially through the shaft hole, each of said pair of shafts being respectively connected to said pair of fastening belts such that each of said pair of fastening belts can rotate relative to each of said pair of base seats.

2. The knob-driven mechanism of claim 1, wherein each of said pair of shafts is respectively connected to each of said pair of fastening belts.

3. The knob-driven mechanism of claim 2, wherein each of said pair of protruding support parts is respectively formed with a tilted guiding surface so as to guide the opposite ends of each of said pair of shafts to extend respectively through the shaft hole.

4. The knob-driven mechanism of claim 1, wherein one of the opposite end of the fastening belt extends between the pair of protruding support parts, each of said pair of shafts extending through each of said pair of fastening belts.

* * * * *